June 20, 1933.    H. G. THUNDER    1,915,109
HEADER AND WINDSHIELD MOUNTING
Filed Aug. 24, 1931
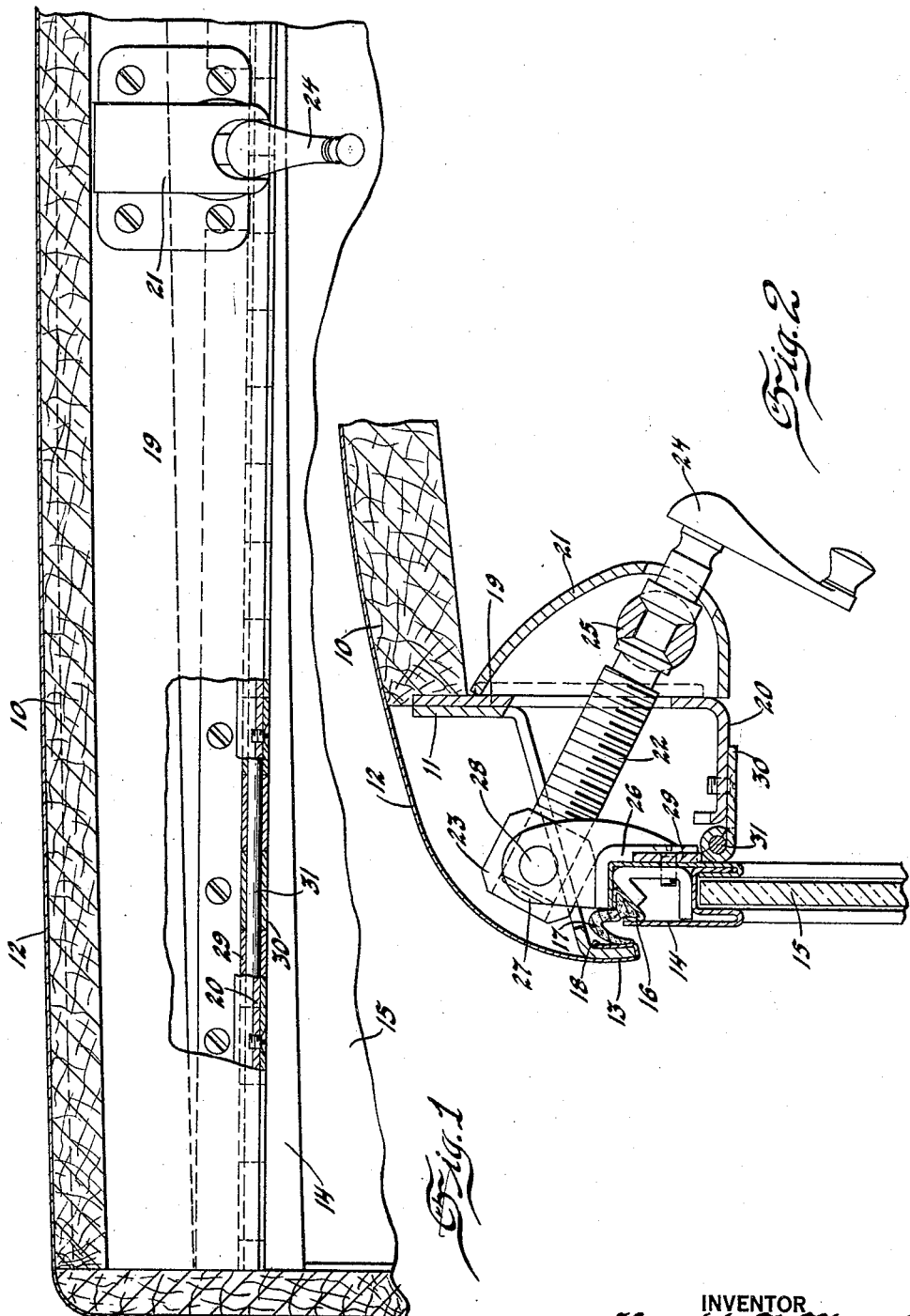
INVENTOR
Harold G. Thunder
BY Whittemore Hulbert
Whittemore Belknap
ATTORNEYS Patented June 20, 1933

1,915,109

UNITED STATES PATENT OFFICE

HAROLD G. THUNDER, OF DETROIT, MICHIGAN, ASSIGNOR TO MOTOR PRODUCTS CORPORATION, OF DETROIT, MICHIGAN, A CORPORATION OF NEW YORK

HEADER AND WINDSHIELD MOUNTING

Application filed August 24, 1931. Serial No. 559,100.

This invention relates to a combination header construction and windshield mounting and more especially to a structure of this character in which the upper edge of the windshield is longitudinally curved.

The several objects, advantages and novel details of construction of the invention will be made more apparent as this description proceeds, especially when considered in connection with the accompanying drawing wherein, Figure 1 is an interior fragmentary elevational view of the header and the upper edge of the windshield, with certain parts broken away to more clearly illustrate the interior construction; and Figure 2 is an enlarged fragmentary vertical sectional view through the header and the upper edge of the windshield.

The present invention finds particular utility in motor vehicles and the like wherein the lower front edge of the deck or top and the upper edge of the windshield are longitudinally arched or curved in contra-distinction to the straight line constructions heretofore quite generally in vogue. In such constructions other than the conventional means must be provided for pivotally or hingedly mounting the winshield and it is to this end that the present invention is directed.

As seen more particularly from the drawing, there is fragmentarily illustrated a portion of the front of the deck 10 of the vehicle, the reference character 11 indicating a frame member associated therewith and 12 the usual water-proof deck material. The lower front edge 13 of the deck is longitudinally curved or arched in an upward direction as is also the top or upper frame member 14 of the windshield 15. In practice it is customary to arch or curve the top frame member 14 of the windshield on a line parallel with the lower edge 13 of the deck, although this is not absolutely necessary as the structure will be operative providing the adjacent edges overlap sufficiently in a closed position of the windshield to permit a weatherproof connection therebetween.

In the present invention the windshield member 14 is provided with a longitudinally extending slot or recess 16 in which a weatherstrip 17 is disposed, this weatherstrip in the closed position of the windshield, engaging the adjacent inner face 18 of the deck.

The reference character 19 indicates the windshield header which as is customary extends transversely of the motor vehicle and is secured to the top structure and to the windshield pillars, in any suitable or desired manner. The header may be made to conform to the transverse curvature of the top structure if the top is transversely curved or arched, but the lower face 20 of the header is straight or in a horizontal plane, or in other words not curved or arched.

The reference character 21 indicates the housing of a windshield operating mechanism which is provided with an operating shaft 22 in the form of a screw upon which a nut 23 threaded thereon is adapted to travel when the shaft 22 is rotated by means of a handle 24. The operating shaft 22 is rockably journaled in trunnions 25 mounted in the housing 21.

The connection between the windshield frame 14 and the traveling nut 23 consists of a bracket 26 secured to the frame and provided with a pair of arms 27 which are pivotally connected by means of trunnions 28 to the nut 23.

For pivotally mounting the windshield on the header 19, I provide preferably a piano-type hinge having companion hinge parts 29 and 30. The hinge part 30 is secured to the lower horizontal face 20 of the header 19 whereas the other hinge part 29 is secured to the inner face of the windshield frame member 14. Owing to the longitudinal arched or curved contour of the frame member 14 the hinge part 29 will obviously not be parallel therewith but its upper edge will for instance coincide with the upper or top edges of the frame member 14 at the ends of the latter and the lower edge of the hinge will substantially coincide with the lower edge of the frame 14 adjacent the center of the latter. The hinge parts 29 and 30 may be secured respectively to the frame member 14 and the header 19 in any preferred or desired manner.

With the construction as just described, when the windshield operating shaft 22 is rotated to cause the nut 23 to travel thereon, the windshield will be rocked about the pintle pin 31 of the hinge by means of the bracket arms 27, the weatherstrip 17 being moved away from the face 18 of the top structure. However, when the windshield is caused to assume its closed position the weatherstrip 17 will engage the face 18 to weather-proof the opening between the top structure and the upper edge of the windshield.

With the herein described construction, a windshield having an arched or curved upper edge in conformity with the transverse curvature of the vehicle top may be hingedly mounted for pivotal movement, the hinge means being located in a straight line as is necessary without rendering the assembled structure unsightly or otherwise objectionable.

Obvious modifications will suggest themselves to those skilled in this art and to this end reservation is made to make such changes as may come within the purview of the accompanying claims.

What I claim as my invention is:

1. In combination, a transversely arched vehicle deck structure having a face, a windshield having a top frame member correspondingly arched, a header having a horizontal face, a hinge secured to said windshield frame and to the horizontal face of said header, and a weatherstrip carried by said windshield frame and engageable with said deck structure face when the windshield is in closed position to weatherproof the opening therebetween.

2. In a windshield mounting, a windshield in which the top frame member is arched longitudinally, a transversely arched deck structure, a header secured to said deck and having a downwardly presented face arranged in a horizontal plane, and a straight hinge arranged parallel with the header face and having one part thereof secured to said windshield frame and the other companion part thereof secured to the said horizontal face of said header.

3. In a windshield mounting, a transversely arched deck structure, a windshield having its top frame member correspondingly arched, a header associated with said deck structure, said header having a downwardly presented face arranged in a horizontal plane, a hinge arranged parallel with the said face of said header and having one part thereof secured thereto, the other companion hinge part being secured to said windshield frame, and a flexible weatherstrip carried by said windshield frame and engaging an overlapping portion of said deck structure when the windshield is closed to weatherproof the opening therebetween.

In testimony whereof I affix my signature.

HAROLD G. THUNDER.